United States Patent Office 3,687,783
Patented Aug. 29, 1972

3,687,783
GUIDE FOR PLACING REINFORCED YARNS IN PREFORMED GROOVES IN RUBBER
William C. Ross, Winchester, Mass., assignor to W. R. Grace & Co., Cambridge, Mass.
Filed June 24, 1970, Ser. No. 49,400
Int. Cl. B65h 57/04
U.S. Cl. 156—436      4 Claims

ABSTRACT OF THE DISCLOSURE

A yarn-laying guide designed to place reinforcing yarns in preformed screw threads in the rubber coated cylinder ply of a belt or printing blanket. A foot, preferably formed of polytetrafluoro ethylene, carries a number of teeth, each of which fits into the screw threads of the base ply. The foot is spring pressed. A yarn guide attached to the foot lays the reinforcing strands directly in the screw threads.

This invention relates to a guide which is particularly useful in accurately positioning the continuous reinforcing strands which are used as the strength-giving member of a laminated structure.

Such structures, e.g., may be textile printing roller press blankets, screen printing blankets, transmission belting, or the wall structures of temporary and collapsible tanks. Rigid wall structures, e.g., launcher tubes, may also be effectively reinforced by the use of this guide.

Of the variety of products which can be made by the use of the present invention, one, a textile print blanket, will be chosen as the illustrative example. These blankets are long, wide, and excessively clumsy and difficult to handle in the various steps of their manufacture. It is extremely difficult to make such a blanket reinforced by helically wound cords without finding that in some part of the winding operation the cords are crossed, or touch each other so that abrasion is possible. This is much more serious when glass yarns are used as the reinforcing strands, for the rubbing of one strand on the other is then the cause of early failure.

A particularly effective way of making such blankets is to form a helical groove on the base ply, in effect making a single or multiple screw thread which extends from one margin of the ply to the other. If the base material is tough enough and stable enough after embossing to acquire a reasonably permanent shape, no heat is used. But if, as is usually the case, rubber or an artificial polymer having rubber-like characteristics is used, the degree of vulcanization given the base sheet at the moment of embossing the screw thread is sufficient only to assure that the shape of the thread will be retained throughout the winding operation. Given such as base sheet, the new guide automatically lays the reinforcing strands within the confines of the successive turns of the helix and assures that no reinforcing strand will cross or touch the adjacent strands. When the blanket is completed, every portion of the helix will be completely encapsulated by rubber or equivalent material.

Although the grooves which are formed in the base ply are parallel to each other, in the specific blanket being described the cylinder ply is spliced to form the base of an endless blanket in such a manner that the end of one channel formed on the open length is set over one channel to the right or left, as the case may be. The result of this offsetting is to form what is, in effect, a screw thread reaching from one margin of the base ply of the blanket to the opposite margin. If desired, a multiple screw thread can be produced by proper offset, and a few parallel yarns can be laid simultaneously in the parallel screw threads formed in the base ply.

Figure 1:
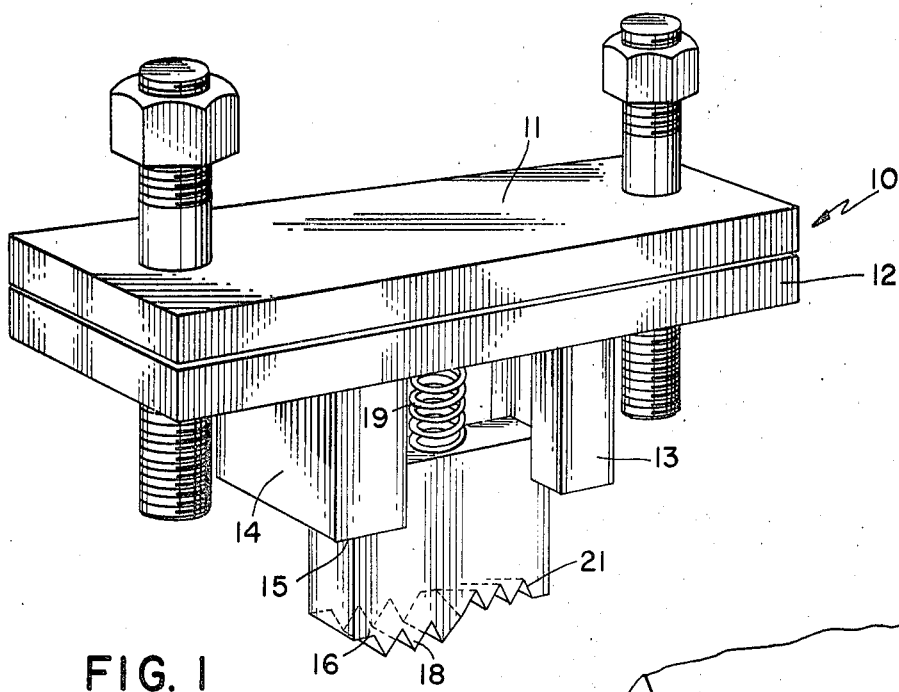
Figure 3:
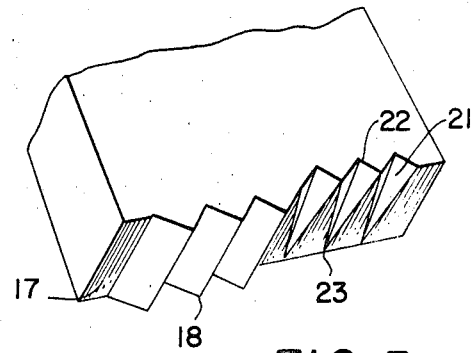
Figure 2:
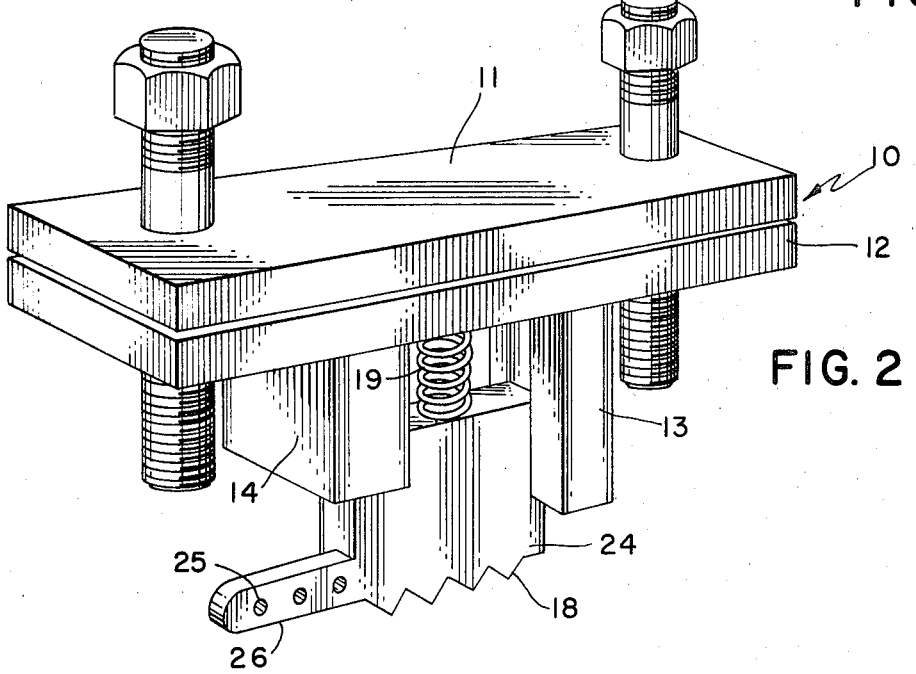

The device can be readily understood from the description, and from the drawing in which FIG. 1 is a perspective front elevation,
FIG. 2 is a front elevation of an alternative form of the follower-guide, and
FIG. 3 is a perspective view of the guide 16 shown in FIG. 1.

Such frames consist typically of a pair of rolls spaced approximately ½ of the length of the blanket apart, over which the spliced loop of a blanket ply is placed. A rigid arm reaches out from a column located on one side of the machine, and overlies the ply at a position approximately in the same plane as that of the axis of the roll. This arm supports a carriage arranged to travel transversely across the blanket ply, and is equipped with bearings permitting it to move freely.

The yarn guiding device, 10, is attached to the traveling head of a winding frame by the clamp, 11. The lower member, 12, of clamp, 11, supports two downwardly directed arms, 13 and 14, each of which is provided with a slot, 15, and in which the guide block, 16, may slide freely. The lower face, 17, of the guide, 16, is formed with a plurality of teeth, 18, which fit into the successive turns of the helix which has been molded in the base ply. The guide, 16, is pressed down by the spring, 19, so that teeth, 18, are held in positive engagement with the grooves in the base ply.

The yarns which are to led into the grooves pass through the pyramidal-shaped slots, 21, cut in the lower face of the guide, 16, so placed that the yarns enter the block, 16, at the base, 22, of the pyramidal slot, 21, and leave at the apex, 23, of each pyramid as the ply moves from the base to the apex of the pyramidal slots. It should be noticed that the distance between the apices of the teeth, 18, and the distance between the apices of the slots, 21, as well as the center distance between the threads of the base ply must be identical so that the teeth, 18, will engage the threads in the base ply, move the yarn guide device, 10, and the traveling head and lay the yarns properly in their respective slots in the base ply.

After the yarns have been wound on the base ply, the blanket is completed by covering the wound ply with a top or working surface made of a fabric coated with an uncured rubber compound. Subsequently the blanket is run through a continuous rotary curing press and converted by vulcanization into a unitary mass. Although but a single base ply and a single ply face layer have been described, the base ply can be made up of more than one layer and the top portion of the blanket which covers the reinforcing cords may also be a multi-ply structure. This construction may be called for when the blanket, as in textile roller press printing, is called upon not only to pick up and carry away the color, but also is the driving element of a considerable proportion of a printing range.

In the particular guide being described, the teeth are .030 of an inch high, and apices lie .067 of an inch apart. The pyramidal guide slots, 21, are .030 of an inch deep on the entrance side of the guide slots, and the center line spacings of the guide slots are .067 of an inch. The guide is made of polytetrafluoro ethylene.

An alternative form of guide is shown in FIG. 2, where the guide member is an arm, 26, projecting laterally from the guide block, 24. The yarns are guided into proper position over the slots by gassing through the eyelet holes, 25, spaced apart at center-line distance equal to the thread pitch of the base ply. The alternative form is effective, but has the disadvantage that the yarns must be threaded through the holes.

Bcause the teeth of the improved guide engage a number of grooves and also because the guide carriage on the winding frame is made to move very easily, there is very little tendency of the guide to jump. The yarns which are wound on the base ply can be unrolled from the yarn packages and led to supported proper positions above the base ply. It is only necessary that the yarn package unwind smoothly to assure that the apparatus works without thread jumping.

Because the guide actually pushes the yarn into the bottom of the groove, there is no tendency to crossthread or to bring successive strands into contact. Each strand is thoroughly insulated by the walls of the groove in which it is laid. Very strong blankets and other laminated structures can be made.

In the specifications and claims, the word "rubber" holds no chemical significance. It has been used in its generic sense to indicate a flexible, elastomeric material.

I claim:

1. For use on winding frames having traversing heads, a guide for laying a reinforcing yarn within the confines of a continuous screw thread extending from substantially one margin of the ply to the opposite margin, formed on the face of the ply of a blanket, the said guide comprising means to attach the guide to said traversing head, arms projecting downwardly from said means having opposed slots, a spring-urged floating follower having its vertical margins engaged in the said slots and bearing a plurality of teeth on its lower end, shaped to fit in successive screw threads in the said ply to cause the guide to move transversely across the said ply by the engagement of its teeth with the said screw threads, and yarn guiding means formed in said lower end of said follower and laterally displaced from the said teeth to lead and to lay a reinforcing yarn within the confines of the said thread continuously as the ply advances beneath the guide.

2. A guide as claimed in claim 1 wherein the guiding elements in the said floating follower are slots cut in the end of said follower having the form of a longitudinal half of a pyramid and spaced apart a distance corresponding to the pitch of the screw threads in the said base ply, the apices of the pyramids being directed along the direction of the blanket ply advance on the winding frame.

3. A guide as claimed in claim 1 wherein the guiding means for laying yarns directly in the screw threads of the base ply comprise an outwardly projecting arm formed on the said follower, pierced with eyelet holes spaced from each other the center line distance between the said teeth of said follower and between the grooves of the base ply.

4. A guide as claimed in claim 1 wherein the said follower is urged downwardly by a spiral spring and wherein the said follower and its yarn-guiding elements are formed of polytetrafluoro ethylene.

References Cited

UNITED STATES PATENTS

| 2,740,594 | 3/1956 | Stevens | 242—158 R |
|---|---|---|---|
| 1,883,401 | 10/1932 | Rolfs et al. | 158—428 |
| 1,973,446 | 9/1934 | Rosenquist | 242—158 R |
| 2,348,987 | 5/1944 | Lock | 242—158 |
| 3,106,352 | 10/1963 | Bennett | 242—7.15 |

OTHER REFERENCES

Metal Progress vol. 88 No. 3. September 1965 pp. 106, 108 and 110.

BENJAMIN A. BORCHELT, Primary Examiner

H. J. TUDOR, Assistant Examiner

U.S. Cl. X.R.

242—158